US008266612B2

(12) United States Patent
Rathi et al.

(10) Patent No.: US 8,266,612 B2
(45) Date of Patent: Sep. 11, 2012

(54) DYNAMIC, CUSTOMIZABLE AND CONFIGURABLE NOTIFICATION MECHANISM

(75) Inventors: Vibha Rathi, Redmond, WA (US);
Derek Cheng, Seattle, WA (US);
Hrishikesh S. Raje, Seattle, WA (US);
Neelima N. Putrevu, Issaquah, WA (US); Jianbo Hou, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 985 days.

(21) Appl. No.: 12/245,079

(22) Filed: Oct. 3, 2008

(65) Prior Publication Data

US 2010/0088692 A1    Apr. 8, 2010

(51) Int. Cl.
G06F 9/44       (2006.01)
G06F 9/445      (2006.01)
G06F 3/048      (2006.01)

(52) U.S. Cl. ......... 717/171; 717/168; 717/174; 715/808

(58) Field of Classification Search ................. 717/168, 717/174
See application file for complete search history.

(56) References Cited

U.S. PATENT DOCUMENTS

| | | | |
|---|---|---|---|
| 6,629,113 B1 | 9/2003 | Lawrence | |
| 6,832,373 B2* | 12/2004 | O'Neill | 717/171 |
| 6,871,216 B2 | 3/2005 | Miller et al. | |
| 6,983,479 B1 | 1/2006 | Salas et al. | |
| 7,146,412 B2* | 12/2006 | Turnbull | 709/220 |
| 7,177,859 B2 | 2/2007 | Pather et al. | |
| 7,200,390 B1* | 4/2007 | Henager et al. | 455/419 |
| 7,206,827 B2 | 4/2007 | Viswanath et al. | |
| 7,249,326 B2 | 7/2007 | Stoakley et al. | |
| 7,299,472 B2 | 11/2007 | de Bonet et al. | |
| 7,305,672 B2 | 12/2007 | Vincent | |
| 7,328,435 B2* | 2/2008 | Trifon | 717/171 |
| 7,334,225 B2* | 2/2008 | Boonie et al. | 717/171 |
| 7,487,466 B2* | 2/2009 | Peters | 715/808 |
| 8,056,070 B2* | 11/2011 | Goller et al. | 717/168 |
| 2004/0243995 A1* | 12/2004 | Sheehy | 717/174 |
| 2005/0154759 A1* | 7/2005 | Hofmeister et al. | 707/104.1 |
| 2005/0262498 A1* | 11/2005 | Ferguson et al. | 717/172 |
| 2006/0031828 A1* | 2/2006 | Won et al. | 717/168 |
| 2006/0195839 A1* | 8/2006 | Lin et al. | 717/174 |
| 2006/0277538 A1* | 12/2006 | Saha et al. | 717/168 |
| 2007/0110231 A1 | 5/2007 | Bales et al. | |
| 2007/0157196 A1* | 7/2007 | Goicea et al. | 717/174 |
| 2007/0277120 A1* | 11/2007 | Wilson et al. | 715/808 |

(Continued)

OTHER PUBLICATIONS

A.J. Bernheim Brush, Notification for Shared Annotation of Digital Documents, Mircosoft Research One Microsoft Way, 2002 ACM 1-58113-453-3/02/0004, Volume No. 4, Issue No. 1, pp. 90-95.*

(Continued)

*Primary Examiner* — Thuy Dao
*Assistant Examiner* — Mongbao Nguyen
(74) *Attorney, Agent, or Firm* — Mayer & Williams PC

(57) ABSTRACT

Provided are arrangements for delivering customized application or update notifications corresponding to a software application so that a user may be informed of the value of the application or update. In addition, the notifications may be rendered by a configurable notification mechanism so that the behavior of the notification, i.e., when and how often it is displayed, to what users and in what conditions, and the like, is also configurable. In this way, users become more invested in the application or update, are more likely to install the same, and become more aware of what changes to expect following installation.

20 Claims, 5 Drawing Sheets

U.S. PATENT DOCUMENTS

| | | | |
|---|---|---|---|
| 2008/0220759 A1* | 9/2008 | Norrman | 455/419 |
| 2008/0222628 A1* | 9/2008 | Batra et al. | 717/171 |
| 2008/0301580 A1* | 12/2008 | Hjelmeland Alams et al. | 715/808 |
| 2009/0319848 A1* | 12/2009 | Thaper | 714/748 |

OTHER PUBLICATIONS

Cisco Systems, Configuration Change Notification and Logging, 2006, pp. 2-5.*

Goce Trajcevski, Dynamic Topological Predicates and Notifications in Moving Objects Databases, 2005 ACM 1-59593-041, pp. 3-8.*

"WS-Notification—Overview", Retrieved at http://publib.boulder.ibm.com/infocenter/wasinfo/v6r1/index.jsp?topic=/com.ibm.websphere.pmc.express.doc/ref/rjwsn_prob0.html>>, Jul. 15, 2008, pp. 1-3.

"Mail Alert", Retrieved at <<http://www.snapfiles.com/get/outlookmailalert.html>, Jul. 16, 2008, p. 1.

Silva Filho, et al., "The Design of a Configurable, Extensible and Dynamic Notification Service", Retrieved at <<http://citeseer.ist.psu.edu/cache/papers/cs/32162/http:zSzzSzwww.eecg.utoronto.cazSzdebs03zSzpaperszSzsilva_filho_etal_debs03.pdf/silvafilho03design.pdf, pp. 8.

* cited by examiner

DYNAMIC, CUSTOMIZABLE AND CONFIGURABLE NOTIFICATION MECHANISM

BACKGROUND

Software updates ensure that users have the potential to enjoy the full and most up-to-date benefits of a software application. In some systems, a pop-up window or other such "toast" notification mechanism is used to notify the user that an update is available. In response, users may then download and install the update. The download and installation may generally occur at the time of a user choosing, though in some cases the update may self-install.

The user is generally unaware of the nature of the update. The updates are often provided with non-specific notifications, such as "An update is available". Moreover, the notifications are provided in a way and on a frequency that bears no relation to the needs and expectations of the user.

SUMMARY

Arrangements are provided for delivering notifications for updates, software applications, or the like, in such a way that a user is given information about the nature of the update or application and what value the same will convey. The arrangements also customize the behavior of the notification, so as to control the content, duration, and target audience of notifications in a dynamic manner. In this way, users become more invested in the update or application, are more likely to install the same, and become more aware of what changes to expect following installation.

In more detail, the arrangements provide a way to customize otherwise generic notifications as well as to configure behavior of the notification itself. These behavioral aspects include: who sees the notification, how long the notification is displayed, what countries should not be shown notifications, what the notification discloses, and the like. These aspects can be controlled in a dynamic manner through a backend service. The configurable elements may be set and modified in a convenient way at any time.

In one aspect, the arrangement includes a computer-readable medium containing instructions for causing a computing device to use notification information to provide customized notifications. First, the computing device communicates over a network to a server to determine if any notifications are available, e.g., concerning updates or applications. If any are available and determined to be applicable to the computing device, notification information is downloaded to the computing device about the update or application and stored thereon. The notification information includes such data as the update or application to which the notification pertains, how the notification should appear, and other information, which may be, e.g., what users should see the notification, how long it should appear, and in what countries it should or should not appear.

To determine if updates or applications are available, the arrangement may poll a network resource. In some cases, e.g., for updates, the network resource may be the original source of the application being updated. In others, an entirely different network resource may be employed. The polling may occur periodically or on any appropriate schedule.

The update or application may then be downloaded and installed. In some arrangements, a user may be asked for their consent prior to downloading. In these cases, upon an affirmative response, the update or application is downloaded.

The notification may appear in a number of forms, including by the use of text or images in various pop-up or 'toast' forms. The notification may also appear in a notification control panel window. The notification generally provides information about the update or application, such as the function of the same, and thus increases the value of the notification to the user. The notification may be rendered on a user interface, and this may include displaying the notification on a display screen or providing an audible notification. In any case, the notification appears at a time and in a manner determined by the notification information. In some cases, a provider may change the notification information after it has been transmitted to a user's computing device; in this case, the change is downloaded to the client system upon the next polling, and the notification information adjusted accordingly.

Whether and when the notification is rendered may be controlled based on one or more additional factors. For example, if other actions are pending, the rendering of the notification may be prohibited, tolled, or postponed. If a user does not appear to be at the computer, as judged by computer activity, the rendering may be prohibited. Renderings of notifications may be spaced in time, so as to not frustrate the user with overly-intrusive notifications. If the user expressly cancels a notification, it may be prohibited from appearing in the future. Notification information may also indicate that a notification expires after a certain duration or after a certain date. Notification information may also provide a start date or time for a notification to appear. In this way, notifications may be coordinated in time with a marketing campaign or the like.

If no new notification information is available from the server, then the client computing device renders notifications according to the already-stored notification information.

Arrangements are also provided for a method of controlling notification behavior associated with an update or application, and such methods may run on servers that provide notification information, updates, applications, or a combination of these. A first step is to create an notification profile, which encapsulates the notification information. The profile need not be a separate data construct, though in many cases it is in order to ease downloading. That is, the profile may either reproduce notification information data also stored elsewhere, or the profile may be represent one or more pointers, or the like, to the location where such data is stored. Various other ways of organizing the notification information into a profile may also be employed.

The notification information may be entered by a user using a graphical user interface, for example. The data contained within the notification information may be that as noted above. The notification information and update or application are made available on a network, such that when a client computer device requests information, the notification information may be downloaded to the same. A user may also employ the graphical user interface to enter changes to the notification information, e.g., to change the expiration date or the appearance. Such changes may be downloaded to the client system, to alter the previously-downloaded notification information, at the next scheduled time that the client system polls the server for information.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

Corresponding reference characters indicate corresponding parts throughout the drawings.

DETAILED DESCRIPTION

Figure 1:
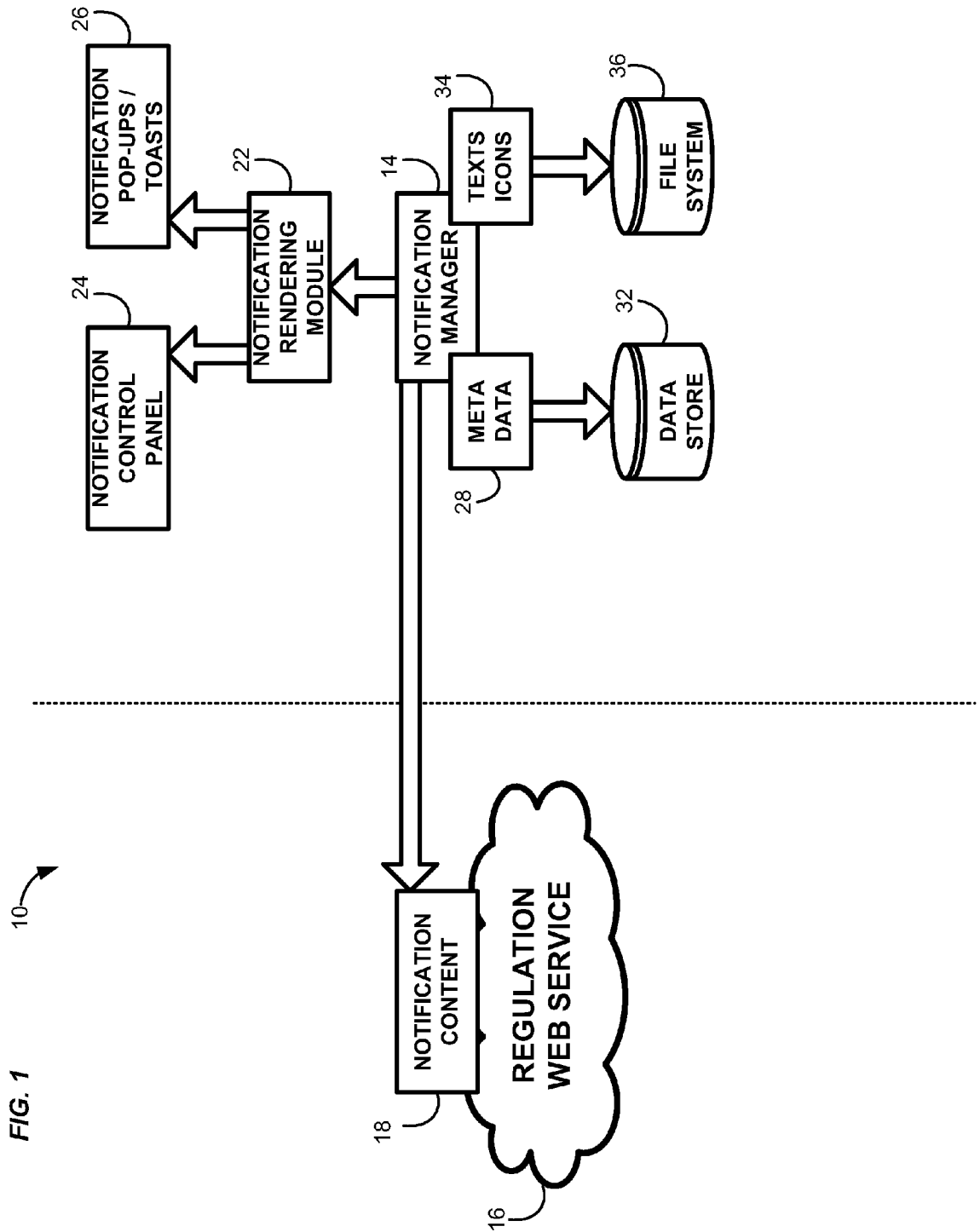
FIG. 1 illustrates a logical diagram of the flow of data between components in an arrangement for a dynamic, customizable and configurable notification mechanism.
Figure 5:
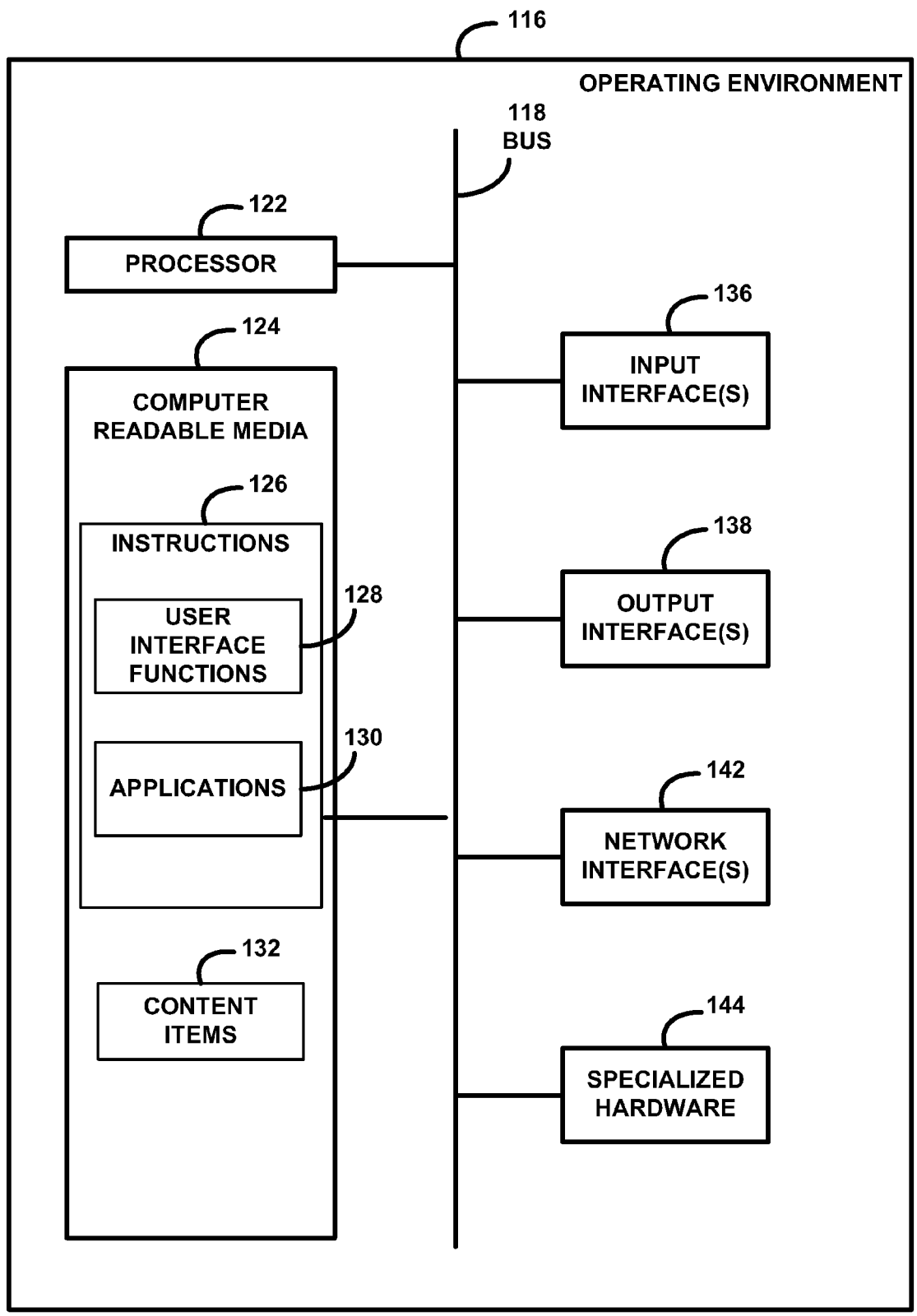
FIG. 5 is a simplified functional block diagram of an exemplary configuration of an operating environment in which the arrangement for dynamic, customizable and configurable notification mechanisms may be implemented or used.

FIGS. 1 and 5 and the accompanying discussion are intended to provide a brief, general description of a suitable network and computing environment, respectively, in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc., that perform particular tasks or implement particular abstract data types. Moreover, those skilled in the art will appreciate that the invention may be practiced with other computer system configurations, including hand-held devices, tablet devices, game consoles, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an exemplary arrangement 10 which may implement an arrangement for a customizable notification mechanism. To the left of the dotted line are server-side modules or components, while to the right of the dotted line are client-side modules or components.

A notification manager module 14 in a client computing device or client system is a module that controls aspects of the notification mechanism. The notification manager 14 acts as a point of contact for the network, and communicates or polls a network resource for update information. In the following description and figures, an arrangement is described with respect to updates. However, it will be clear that an analogous arrangement may be employed to provide notifications about software applications as well. In general, the arrangement may be employed to dynamically customize and configure any type of server-controlled notification, not just those pertaining to updates or applications.

In FIG. 1, the network resource is a regulation web server 16, i.e., a web server that regulates updates and notifications, which contains notification content 18. The notification manager module 14 also constructs the notification that will be presented to the user, using data from the downloaded notification information. The module 14 may also check for validity of the notification information and its associated update. For example, it may detect if the client system already has the most-recent version of the application and/or if the update applies to a current software application resident on the client system. In other implementations, a different part of the system may check to see if the update applies to the computer.

The notification manager module 14 may communicate or poll the network resource according to any number of schedules. For example, it may poll the resource whenever the client system initializes a connection with a network, and every hour thereafter. It may poll the resource once a day, once a week, or on any other schedule. In some implementations, the network resource may detect a network connection with the client system through an instant-message-type client, and may send a message to the client system indicating that an update is available.

If an update is available, the notification manager module 14 receives, e.g., via downloading, notification information as well as the update itself. The two need not be delivered at the same time; in fact, in many cases the notification manager module 14 receives the notification information first and later, following a user indication, downloads the update itself.

The downloaded notification information may include metadata as well as appearance information. In one implementation, metadata 28 is stored in a data store 32 and information 34 about the appearance of the notification, such as text and icons, is stored in a file system 36. The appearance information 34 may include, e.g., the icon to be displayed, any text to accompany the notification, its title, and the like. The metadata 28 stored in the data store 32 provides information about the behavior of the notification, including, for example, to whom the notification should be displayed, the duration of the notification, an expiration date, and the like. Other behavior information may also be included, and in any given implementation not all of these parameters need be included.

An notification rendering module 22 employs the notification information from the notification manager module 14 to render the notification. The notification rendering module 22 may perform this function in several ways, shown in FIG. 1 as via the use of a notification control panel 24 or via a notification pop-up or 'toast' window 26.

In the first case, a notification control panel 24 may be used by users even prior to a pop-up window being displayed about the notification. Some users choose to pro-actively check for updates on a regular basis, or to install a number of updates at a time, and such a control panel serves to accomplish these functions in a convenient manner. Even if a user never uses a control panel 24, they may become aware of updates through the use of pop-up notifications 26. The format of these, including their appearance, how often they appear, when they expire, and the like, are controlled by the downloaded notification information.

In both cases, the control panel 24 and the pop-up notification 26, the notification information may control the behavior. For example, the appearance and behavior of the notification in the control panel may be dictated by the notification information. The notification information may also call for the notification to be customized in the control panel but not in a pop-up, or vice-versa. In certain cases, the notification information will call for both locations to show notifications in a similar format.

Figure 2:
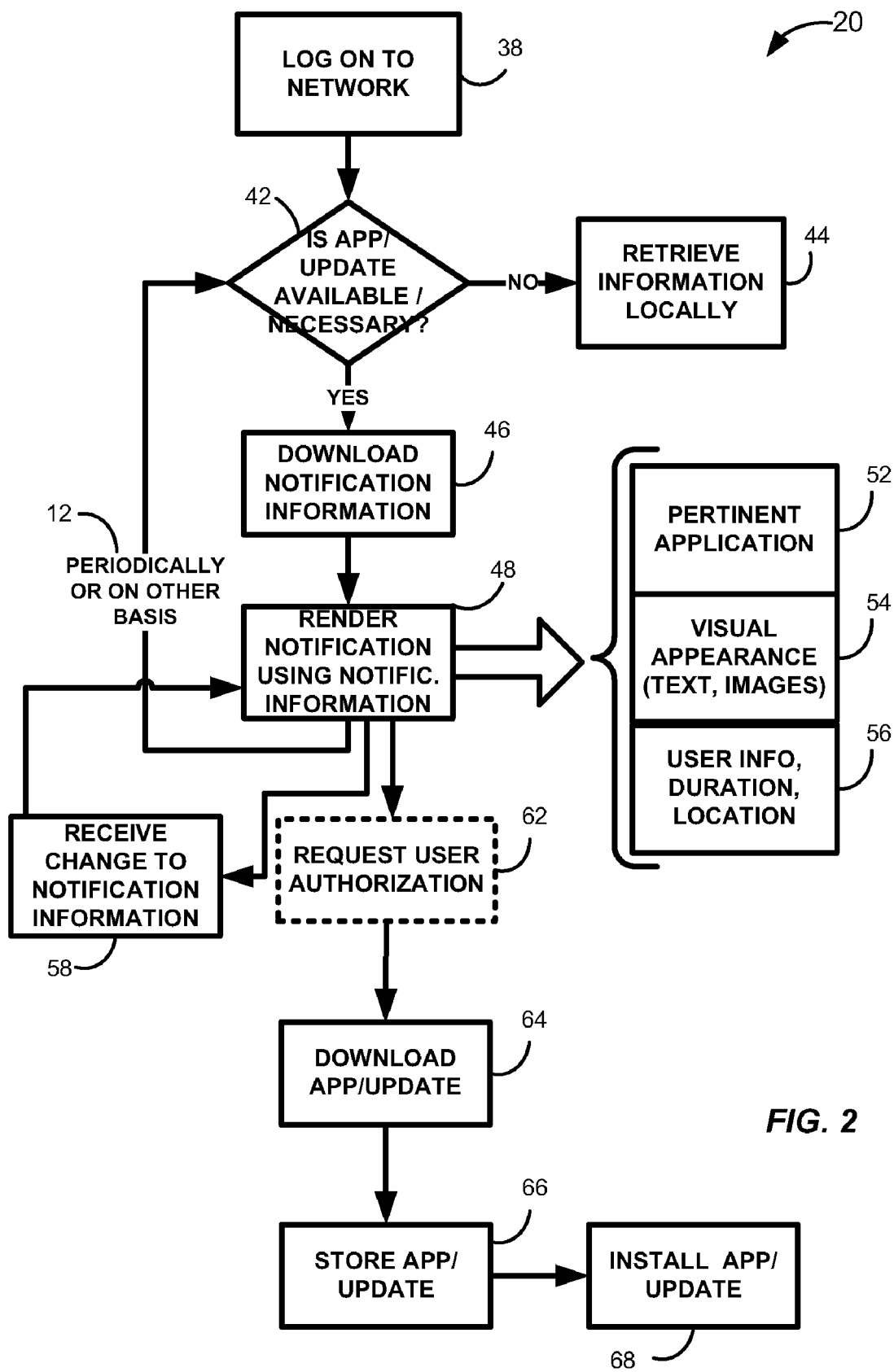
FIG. 2 is a flowchart for a method of customizing and configuring notification mechanisms.

FIG. 2 shows a flowchart of a method 20 for providing customized notifications. After a client system logs onto a network (step 38), the client system polls a network resource to determine if an update is available (step 42). The client system may independently poll the network resource as part of a periodic check (step 12) for updates or the same may have received a message or other communication prompting the polling.

If the polling determines that no update is available, then information may be retrieved locally (step 44) and the same used to determine if notifications are to be presented to the user. In this case, the same notification behavior and content that were previously relied on to display notifications continue to be the basis for notification display.

If the polling determines that an update is available, then notification information about the update may be downloaded (step 46) from a server. As noted elsewhere, the download may be from a regulation web server or any other web server that may house such updates.

A notification may then be rendered based on the downloaded notification information (step 48). The way in which the downloaded notification information is used to render, or prohibit or toll the rendering of, notification information is the subject of FIG. 3. The rendered notification may provide application information (step 52), i.e., information about the application to which the update pertains, and the rendered notification is based on the appearance information (step 54), i.e., text and image information about how the notification should appear. The behavior of the rendering may also be based on other information (step 56), i.e., information about what users should see the notification, the duration of the notification, what countries should have which language about the notification, an expiration date for the notification, a start date or end date for the update, and the like.

In some implementations, a user may be asked if they wish to download the update (step 62). If the user complies, or if no choice is given, then the update is downloaded (step 64). The update may then be stored (step 66) and installed (step 68).

The arrangement also contemplates accepting a change in the notification information. For example, the company that issued the update may desire to change the expiration date of an update. While for clarity this step is shown following the display notification step (step 48) in FIG. 2, it may occur anywhere in the process. A change is made to a set of notification information, e.g., a notification profile, using a user interface associated with the network resource. Upon the next polling, the client system recognizes that a change is available and then receives the change to the notification information (step 58). The changed notification information is then employed as the new basis for rendering that notification (step 48).

Figure 3:
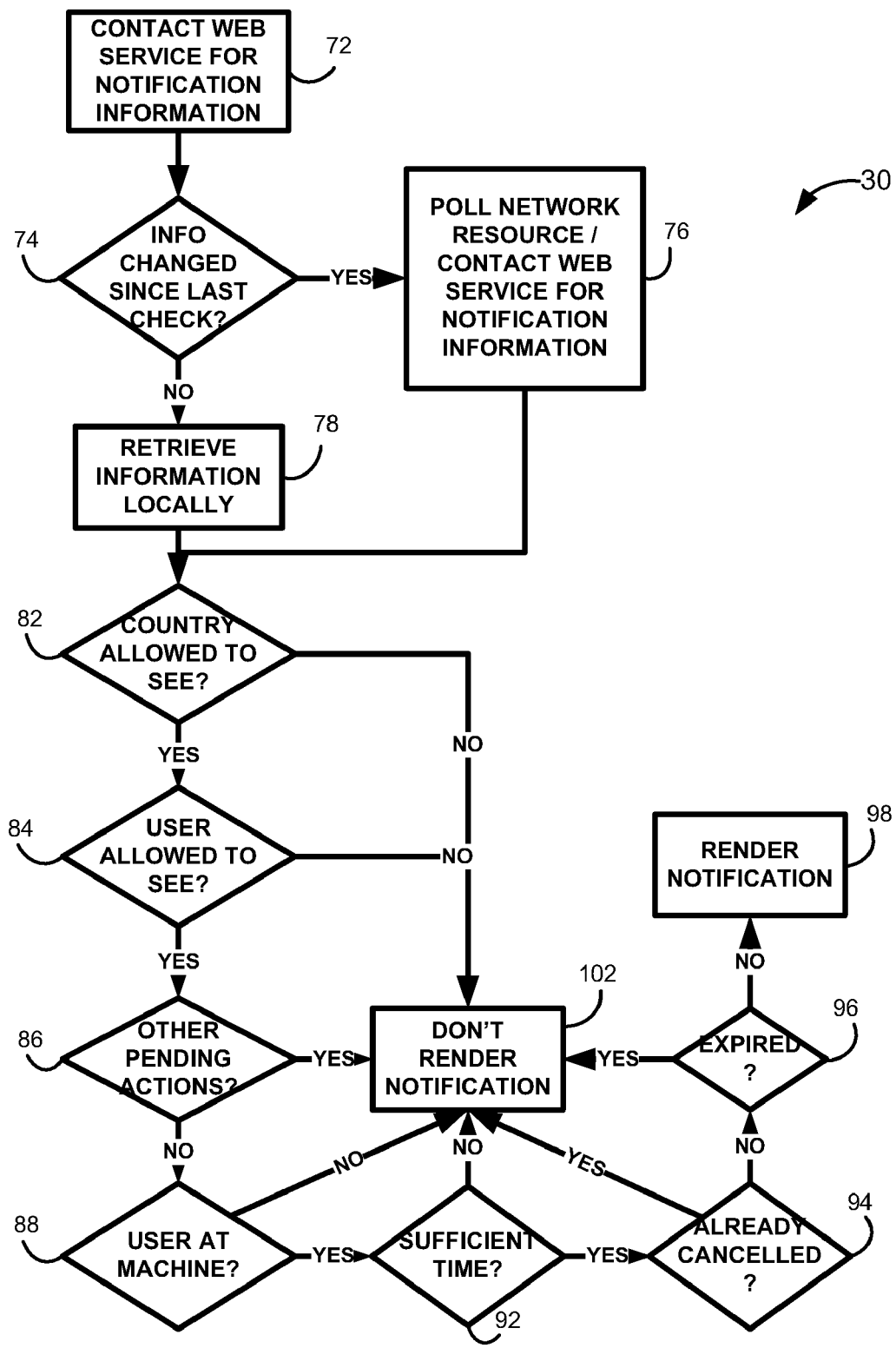
FIG. 3 is a more detailed flowchart for the method of customizing and configuring notification mechanisms.

FIG. 3 shows additional details of a method 30 that shows how the notification information causes a notification to be displayed. The first steps are similar to those in discussed in connection with FIG. 2 and are shown here for completeness.

A web service is contacted for notification information (step 72). A decision is made as to whether the notification information available on the web service has changed since the last polling (step 74). In that case, the notification information on a client system is not the latest version, and the client system downloads the latest notification information from the web service or network resource (step 76). The method then proceeds with step 82. If the web service indicates that no new notification information is available, then the information is retrieved from the local client system (step 78) and is used to render notifications.

A first step may be to determine from the notification information if a country in which the client system is based is allowed to see the notification (step 82). If it is, then the process may pass to the next step. If it is not, then the notification is not rendered (step 102).

In this connection it is noted that certain countries have certain rules about what needs to be or should be displayed when downloading applications and updates. This step is intended to allow customization of the display of a notification based on these country-specific rules. It will be clear that while a country-specific rule is noted here, the rule may be specific with respect to any locale, not just countries. The country or locale of a client system may be determined by analysis of IP addresses, geolocation, user input, or via other means. In some embodiments, a look-up table may be used to choose a specific notification text that applies to the given country or locale.

It is also noted in this connection that, in one implementation, this first check is done on the server side, while the others, described below, are performed on the client side. However, in general, any of the steps may be performed on either the client or the server side.

A next step may be to determine from the notification information if the user, in particular this computing device, is allowed to see the notification (step 84) and install this update. If it is, then the process may pass to the next step. If it is not, then the notification is not rendered (step 102). In this connection it is noted that a software manufacture may desire to release an update to a subset of all users at any given time. For example, 10% of users may initially receive notification about an update, as well as the ability to download the same. This step is intended to allow updates to be phased-in as well as controlled. The percentage (or other filter) of users who are notified about updates may be changed as needed by the software application producer or other provider. Even after an update has become downloadable and/or been downloaded, these parameters may be changed so as to, e.g., increase the number of users who receive an update, allow all users to receive the update, or cease further update downloading.

In more detail, and in one implementation, each user who checks for this update may be assigned a random number in a range, e.g., 1-100. For 10% coverage, the notification and update may be made available for all those users whose assigned number is from 1-10. Others may be notified that there are no updates available. In some implementations, this test may be the first step conducted. That is, if there are no updates for a user as determined by this step, then there is generally no need to continue with the other steps of the method. Instead, the user may see a message such as "No updates available" or the like. Numerous variations of this method will be apparent from this teaching.

A next step may be to determine if there are any other actions pending that may prohibit the rendering of the notification (step 86). For example, if a critical security update is available, it may be undesirable to display a notification about a minor non-critical fix to a rarely-used software application. Rather, a notification about the critical security update should be rendered first. More critical or higher-priority updates are one variety of pending action, but numerous other pending actions may be envisioned which would likewise bar, prohibit, toll, or postpone rendering of a notification in a given circumstance. In any case, if no other actions are pending, then the process may pass to the next step. If other actions are pending, then the notification is tolled, postponed, or not rendered (step 102).

A next step may be to determine if the user is at, and is using, their client system (step 88). If so, they may more be likely to attract the user's attention to the notification. This step may be accomplished by rendering the notification at a time when an application is recognized to be in use. If a user is thus detected, then the process may pass to the next step. If not, then the notification may be prohibited or tolled until such time as a user is detected (step 102).

A next step may be to determine, either from the notification information or from information previously resident on the client system, if a sufficient span of time has passed since the last time the notification was rendered (step 92). In this way, a user does not see the same notification time and again and become frustrated with the same. A threshold for a sufficient span of time may be, e.g., several hours, a day, a week, or the like. It is noted that these are exemplary times, but the choice of any threshold is arbitrary and left to the dictates of the notification designer. If a sufficient time has passed, then the process may pass to the next step. If not, then the notification may be prohibited until such span of time has passed (step 102).

A next step may be to determine if a user has cancelled the notification (step 94). This may occur either via the notification control panel or via a button on a pop-up. Cancellation may also occur upon the user download or installation of the update. In this way, a user may eliminate the occurrence of a notification altogether. Intermediate mechanisms may also be employed, such as so-called 'snooze' buttons, to enable delaying of engagement with a notification. If the user has not cancelled the notification, then the process may pass to the next step. If not, then the notification may be prohibited (step 102).

A next step may be to determine if the notification has expired according to the stored notification information. If a notification has expired, then the user in some implementations does not continue to receive notifications and thus cannot install the update. In other implementations, the notification may still appear on the notification control panel and the update may still be downloadable. In still other cases, updates may be cumulative; in such cases, missing one update means that the user will install the update when an even newer update is available. If the notification has not expired, then the process may pass to the next step, which is to render the notification (step 98). If not, then the notification may be prohibited (step 102).

It should be noted that not all of these steps are required in any given implementation. One or more of these parameters may be, e.g., inapplicable or irrelevant for a given network. Consequently, FIG. 3 is intended to give a non-exhaustive list of potential factors on which to base a decision about displaying a notification, but no one parameter is necessarily required in any given implementation.

Using this information, the notification may thus be customized for a given client system. For example, using information about the application to which the update pertains, the user may be displayed information about which application will have enhanced features, and in some cases may even be told what those features will include. Using the country-specific information, the user may be given information in line with their country's requirements for such notices. In some cases this customization may be performed by way of a look-up table: by knowledge of the country, e.g, by analysis of an IP address, geolocation, or the like, the chosen notification may be looked up and applied to the notification. The same may be employed to choose the language of the notification. By knowledge of other pending actions, the user may be spared the inconvenience of being notified of lesser priority updates when more important ones should be updated. By knowledge of whether the user is at their computer, the likelihood of the user seeing the notification is greater. By knowledge of how much time has elapsed from the notification information first being rendered, as well as if the notification has expired or if the user has cancelled the notification, users can avoid the annoyance of notifications that are out-of-date or that they have already indicated a desire to avoid. In these as well as many other ways, the notification may be customized.

Figure 4:
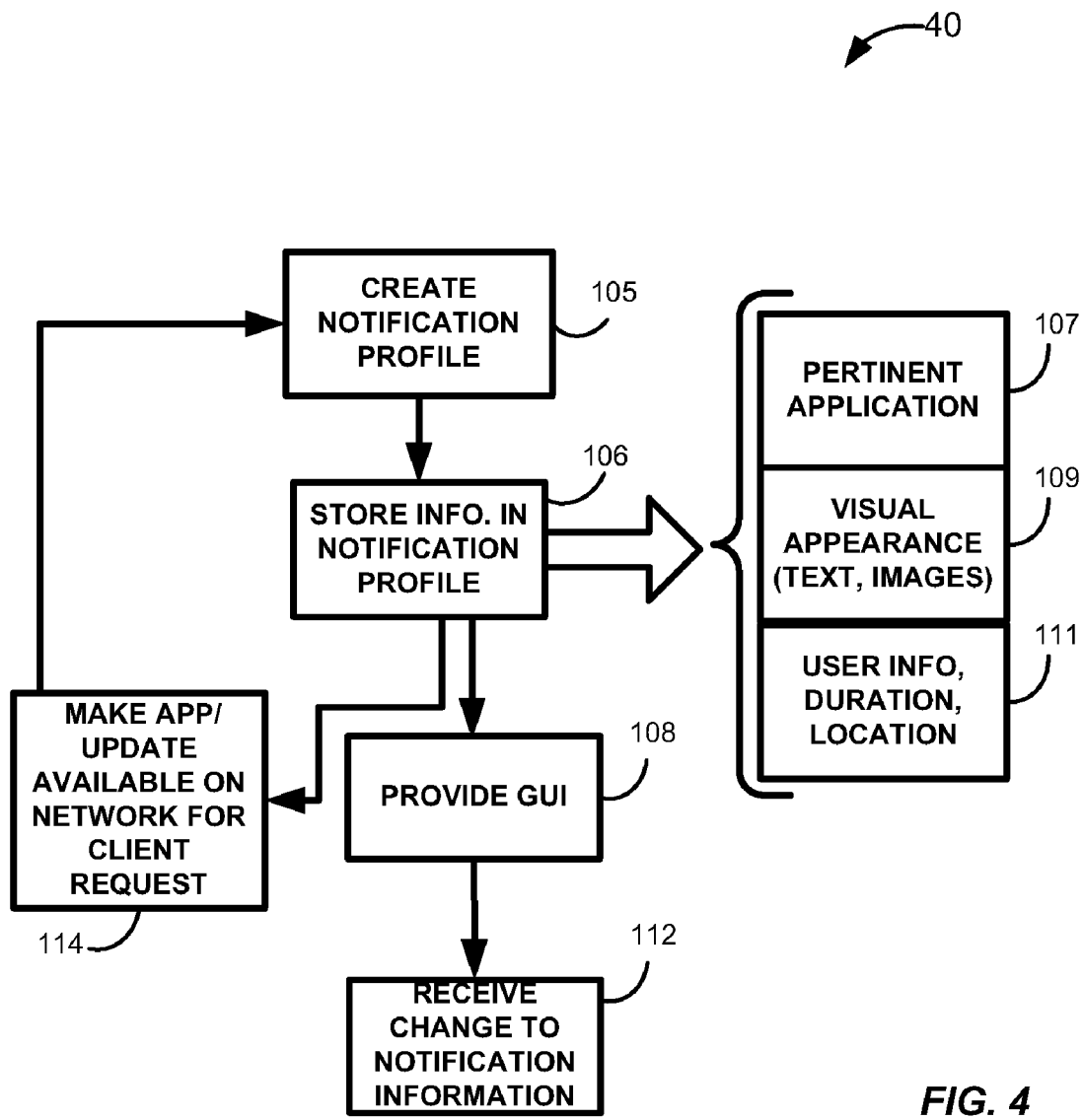
FIG. 4 is a flowchart for the method of customizing and configuring notification mechanisms, showing in more detail the steps taken on the server side.

FIG. 4 is a flowchart of a method 40 for creating, on a server side, customizable notifications. A first step is the creation of an update notification profile (step 105). This profile may encapsulate the metadata employed in the notification information, as well as any file information about the appearance of the notification. In one implementation, the profile includes a copy of the data entered about these parameters. In another implementation, the profile does not contain the data but rather includes pointers to the data. Other variations are also possible.

A next step is to enter the notification information (step 106). The entering and storing of notification information may include entering application information (step 107), i.e., information about the application to which the update pertains, entering appearance information (step 109), i.e., information about how the notification should appear, which may include the uploading of icon files and other image files, as well as text and title information, as well as any other information employed in the rendering of a notification. The entering and storing of notification information also includes entering other information (step 111), i.e., information about what users should see the notification, the duration of the notification, what countries should have which language about the notification, an expiration date for the notification, a start date or end date for the update, and the like.

Once the notification information has been entered and stored, the same may be made available on a network for responding to client requests (step 1 14). In particular, when a client system polls the network resource containing this information, the network resource may respond and, if new notification information is available, may download the same to the client system.

While the above entering and storing of notification information may occur by the user entering data using a user interface, the same or a different user interface may be provided (step 108) and employed for entering changes to previously-stored notification information (step 112).

While a number of steps have been disclosed above for determining if a notification should be rendered, it will be clear, given this teaching, that any arbitrary number and nature of such steps may be implemented in a given system. That is, the steps disclosed above are examples and are not intended to be limiting. Other steps may also be implemented.

FIG. 5 is a block diagram of an exemplary configuration of an operating environment 116 in which all or part of the arrangements and/or methods shown and discussed in connection with the figures may be implemented or used. Operating environment 116 is generally indicative of a wide variety of general-purpose or special-purpose computing environments, and is not intended to suggest any limitation as to the scope of use or functionality of the arrangements described herein.

As shown, operating environment 116 includes processor 122, computer-readable media 124, and computer-executable instructions 126. One or more internal buses 118 may be used to carry data, addresses, control signals, and other information within, to, or from operating environment 116 or elements thereof.

Processor 122, which may be a real or a virtual processor, controls functions of the operating environment by executing computer-executable instructions 126. The processor may execute instructions at the assembly, compiled, or machine-level to perform a particular process.

Computer-readable media 124 may represent any number and combination of local or remote devices, in any form, now known or later developed, capable of recording, storing, or transmitting computer-readable data, such as computer-executable instructions 126 which may in turn include user interface functions 128 and applications 130. In particular, the computer-readable media 124 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. The computer-readable media may also include transmission media and data associated therewith. Examples of transmission media/data include, but are not limited to, data embodied in any form of wireline or wireless transmission, such as packetized or non-packetized data carried by a modulated carrier signal.

Computer-executable instructions 126 represent any signal processing methods or stored instructions. Generally, computer-executable instructions 126 are implemented as software components according to well-known practices for component-based software development, and are encoded in computer-readable media. Computer programs may be combined or distributed in various ways. Computer-executable instructions 126, however, are not limited to implementation by any specific embodiments of computer programs, and in other instances may be implemented by, or executed in, hardware, software, firmware, or any combination thereof.

The computer-readable media 124 may further include content items 132 stored thereon, which may be generally be data files, such as multimedia files, and the like.

Input interface(s) 136 are any now-known or later-developed physical or logical elements that facilitate receipt of input to operating environment 116.

Output interface(s) 138 are any now-known or later-developed physical or logical elements that facilitate provisioning of output from operating environment 116.

Network interface(s) 142 represent one or more physical or logical elements, such as connectivity devices or computer-executable instructions, which enable communication between operating environment 116 and external devices or services, via one or more protocols or techniques. Such communication may be, but is not necessarily, client-server type communication or peer-to-peer communication. Information received at a given network interface may traverse one or more layers of a communication protocol stack.

Specialized hardware 144 represents any hardware or firmware that implements functions of operating environment 116. Examples of specialized hardware include encoders/decoders, decrypters, application-specific integrated circuits, clocks, and the like.

The above has described specific ways for implementing an arrangement for providing configurable and customizable notifications. Numerous variations may be seen. For example, while use of a regulation web server has been described, any type of server accessible over a network may be employed. In some implementations, updates and notification information will be obtained from the same server that originally was the source for downloading the original application. In other implementations, entirely different servers may be employed. While certain parameters have been discussed for determining if a notification should be displayed, prohibited, tolled, or postponed, other parameters may also be employed.

The methods shown and described above may be implemented in one or more general, multi-purpose, or single-purpose processors.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A hardware computer-readable storage medium containing instructions which, when executed by one or more processors disposed in an electronic device, implement a method for customizing notification mechanisms, the method comprising the steps of:

determining if an application or update corresponding to one or more applications is available and applicable to the computing device;

if an application or an update corresponding to one or more applications is available, then downloading to a client computing device notification information about the application or update, the notification information including:

i. to what application or update the notification pertains;

ii. a visual appearance of a notification to be displayed on the client computing device; and iii. at least one datum selected from the group consisting of: what client computing devices should be shown the notification, a duration of the notification, a starting or ending time or date of the notification, and in which countries the notification should be displayed.

2. The medium of claim 1, in which the determining includes polling a network resource, the network resource being a source for application information.

3. The medium of claim 1, in which the determining occurs periodically.

4. The medium of claim 1, further comprising downloading the application or update to the client computing device.

5. The medium of claim 4, in which the downloading the application or update to the client computing device occurs subsequent to a receipt of an input from a user indicating that the application or update should be downloaded.

6. The medium of claim 1, in which the visual appearance includes text or images associated with the notification.

7. The medium of claim 1, further comprising rendering the notification on a user interface, the rendering occurring at a time and in a manner consistent with the notification information.

8. The medium of claim 1, further comprising storing the notification information.

9. The medium of claim 1, further comprising receiving a change to the notification information, in which the rendering occurs at a time and in a manner consistent with the changed notification information.

10. The medium of claim 7, in which the rendering is configured to occur at a time when there are no other pending actions.

11. The medium of claim 7, in which the rendering is configured to occur at a time when the user is detected to be using the client computing device.

12. The medium of claim 7, in which the rendering is configured to occur after a span of time following prior rendering of the notification, the span of time greater than a predetermined threshold.

13. The medium of claim 7, further comprising inhibiting future rendering if a cancellation notice is received from a user.

14. The medium of claim 7, further comprising inhibiting future rendering if the notification information indicates an expiration of a time period associated with the notification.

15. The medium of claim 1, in which if the determining step determines that no applications or updates are available, then rendering the notification on a user interface, the rendering occurring at a time and in a manner consistent with the notification information previously stored in the client computing device.

16. A hardware computer-readable storage medium containing instructions which, when executed by one or more processors disposed in an electronic device, implement a method for controlling notification behavior associated with an application or update, the method comprising the steps of:

creating a notification profile upon determining that an application or update corresponding to one or more applications is available and applicable to a client system;

storing, in the notification profile, notification information including the following:

i. to what application an application or update pertains;

ii. a visual appearance of a notification to be displayed to the user; and iii. at least one datum selected from the group consisting of: what users should be shown the notification, a duration of the notification, a starting or ending time or date and in which countries the notification should be displayed;

making the notification information available on a network;

such that upon request from the client system, the notification information is downloaded to the client system.

17. The medium of claim 16, further comprising providing a graphical user interface for the receipt of information corresponding to changes to the notification profile.

18. The medium of claim 17, further comprising receiving information about a change to the notification profile, and changing the notification profile to be consistent with the change.

19. A system for customizing notification mechanisms, comprising:

at least a processor;

a notification manager module executed by the processor to poll a network resource and receive notification information about an application or update corresponding to a software application; and a notification rendering module executed by the processor to render a notification on a client system upon determining that the application or update corresponding to the software application is available and applicable to client system, the notification appearance and behavior customized according to the notification information, and the notification information including:

i. to what application or update the notification pertains;

ii. a visual appearance of a notification to be displayed on the client computing device; and iii. at least one datum selected from the group consisting of: what client computing devices should be shown the notification, a duration of the notification, a starting or ending time or date of the notification, and in which countries the notification should be displayed.

20. The system of claim 19, in which the notification rendering module renders the notification on a notification control panel, in a pop-up window, or both.

* * * * *